Feb. 7, 1933.     S. C. EWING     1,896,074
SYNCHRONOUS MOTOR CONTROL SYSTEM
Filed Jan. 23, 1932

Inventor:
Samuel C. Ewing,
by Charles E. Mullen
His Attorney.

Patented Feb. 7, 1933

1,896,074

UNITED STATES PATENT OFFICE

SAMUEL C. EWING, OF SCHENECTADY, NEW YORK, ASSIGNOR TO GENERAL ELECTRIC COMPANY, A CORPORATION OF NEW YORK

SYNCHRONOUS MOTOR CONTROL SYSTEM

Application filed January 23, 1932. Serial No. 588,361.

My invention relates to synchronous motor control systems and particularly to means for controlling the excitation of the field winding of a synchronous motor.

One object of my invention is to provide an improved arrangement for connecting the field winding of a synchronous motor to a source of excitation when the motor reaches substantially synchronous speed during the starting operation of the motor, for disconnecting the motor field winding from the source of excitation when the motor falls out of synchronism and for reestablishing the connection of the motor field winding to the source of excitation when the motor speed again reaches substantially synchronous speed.

My invention will be better understood from the following description when taken in connection with the accompanying drawing and its scope will be pointed out in the appended claims.

Figure 1:
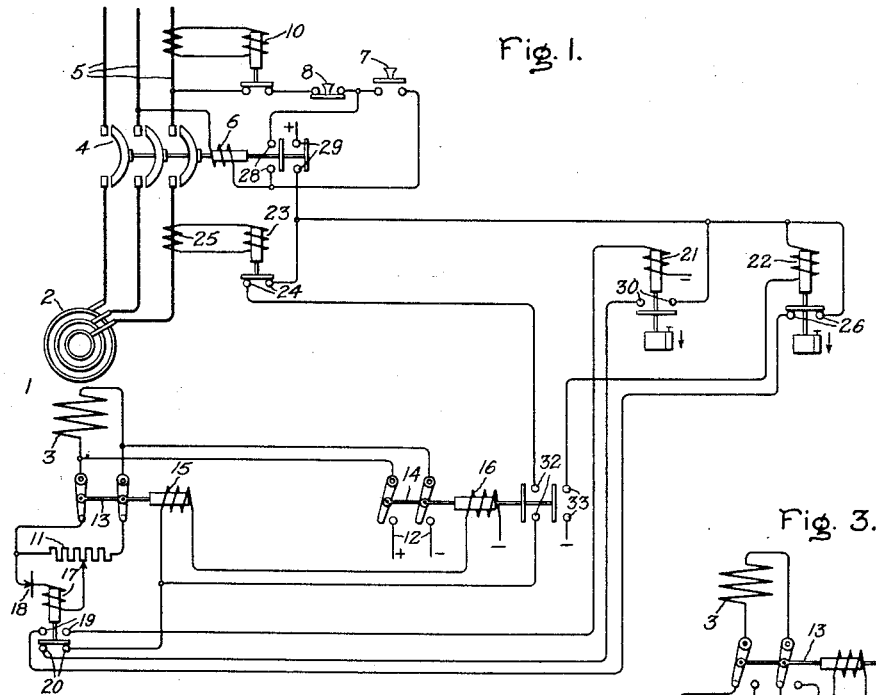
Figure 2:
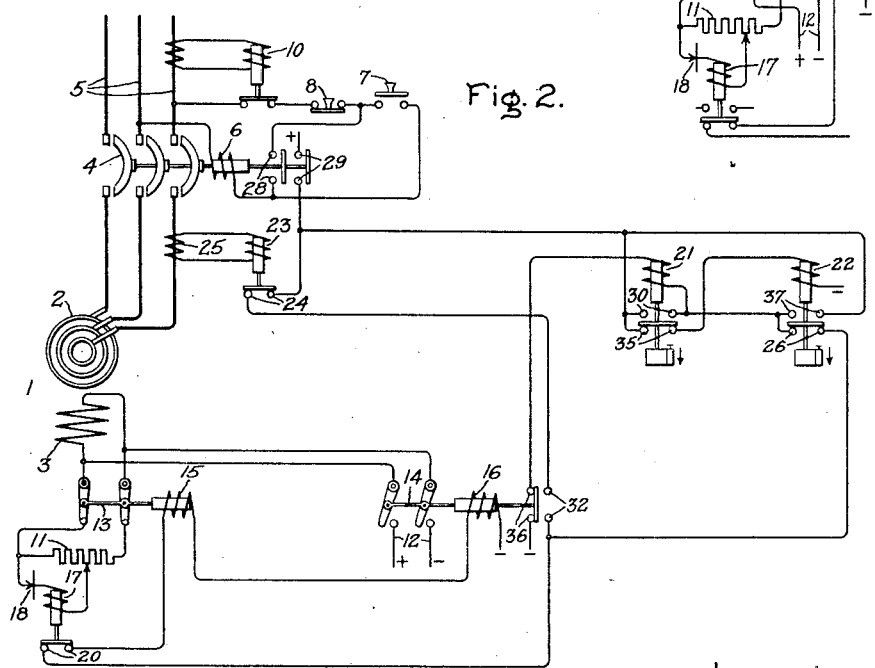
Figure 3:
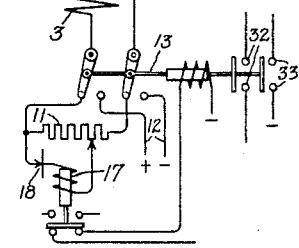

In the accompanying drawing, Fig. 1 is a diagrammatic showing of a synchronous motor control system embodying my invention; Fig. 2 is a modification of the control system shown in Fig. 1 and Fig. 3 is a modification of a portion of the arrangements shown in Figs. 1 and 2.

Referring to Fig. 1, 1 represents a synchronous motor which is provided with an armature winding 2 and a field winding 3.

In order to simplify the disclosure, I have shown my invention in connection with a full voltage starting arrangement for a synchronous motor so that it is started by connecting the armature winding 2, by means of a suitable switch 4, directly across an alternating current supply circuit 5. Therefore, normal voltage is supplied to the motor armature winding to start the motor from rest and bring it up to synchronous speed. It is to be understood, however, that my invention is applicable to any other suitable arrangement for starting a synchronous motor from rest and bringing it up to synchronous speed. As shown in the drawing, the switch 4, which connects the armature winding 2 to the supply circuit 5, has a closing coil 6 which is arranged to be connected across one phase of the supply circuit 5 when a suitable "start" switch 7 is closed. This switch 7 may be a float switch, a time switch, a thermostat, hand switch, or any other suitable means, examples of which are well known in the art, for indicating when the motor is to be started. In the circuit of the closing coil 6 I provide the normally closed contacts of a suitable manually controlled "stop" switch 8. The switch 4, when closed, completes for its closing coil 6 a locking circuit which is independent of the "start" switch 7 so that this switch may be opened without effecting the opening of the switch 4.

In order to disconnect the motor 1 from the supply circuit 5 in response to short-circuit conditions in the motor armature winding, a suitable overload responsive device 10 is provided for opening contacts in the locking circuit of the closing coil 6.

The field winding 3 of the motor 1 which is normally short-circuited through a discharge resistor 11 is arranged to be connected to a suitable source of excitation 12 when the motor reaches a predetermined speed. In the particular arrangement shown in Fig. 1, the field winding 3 is normally connected in series with the discharge resistor 11 by means of a switch 13 and is arranged to be connected to the source of excitation 12 by a separate switch 14. It is obvious, however, that these two switches may be a single two position switch having a single closing coil, as shown in Fig. 3. The switches 13 and 14 are provided with closing coils 15 and 16 respectively, which are connected in any suitable manner, so that they are energized and deenergized simultaneously. As shown in the drawing, this result is accomplished by connecting the closing coils 15 and 16 in series. The closing coil 15, when energized, opens the switch 13 to disconnect the field winding 3 from the discharge resistor 11. The coil 16, when energized, closes the switch 14 to connect the field winding 3 across the source of excitation 12.

Any suitable speed responsive means, examples of which are well known in the art, may be provided for effecting the energization of the closing coils 15 and 16 when the motor reaches substantially synchronous speed. In the drawing I have illustrated the speed responsive arrangement disclosed and claimed in the copending application of Harold T. Seeley, Serial No. 541,315, filed June 1, 1931, and assigned to the same assignee as this application. This arrangement consists of a relay 17 which is connected to the motor field circuit through a suitable rectifying device. As shown, the relay 17 and a rectifier 18 are connected in series across a portion or all of the discharge resistor 11. With such an arrangement, the induced current which flows through the motor fielding winding while the motor is operating below synchronous speed causes the relay to attract its armature and maintain it in its attracted position until the motor reaches approximately synchronous speed at which time the frequency of the induced current becomes so low that the portion of each cycle during which no current flows through the relay winding is sufficiently long to allow the relay armature to be restored to its normal position.

In the particular arrangement shown in Fig. 1, the relay 17 is provided with contacts 19 which are closed when the relay armature is in its attracted position and with contacts 20, which are closed when the relay armature is in its normal position. The contacts 20 are connected in series with the closing coils 15 and 16 so that the switch 13 can be opened and the switch can be closed only when the frequency of the induced current is below a predetermined value and, therefore, the motor has reached substantially synchronous speed.

The contacts 19 control the circuit of a suitable time relay 21 which is arranged to open the energizing circuit of the closing coils 15 and 16 a predetermined time after it is completed. A holding circuit for the closing coils 15 and 16, however, is completed before the time relay 21 opens the energizing circuit for these coils. This holding circuit includes the contacts 32 of switch 14 and contacts 24 of a pull-out relay 23 which is connected in any suitable manner, examples of which are well known in the art so that it operates in response to an electrical condition which is produced by the motor falling out of synchronism. It is also obvious that when a single field switch 13, as shown in Fig. 3, is used contacts 32 of this switch could also be used as above. In the particular arrangement shown in the drawing the relay 23 is connected so that it operates to open its contacts 24 in series with the closing coils 15 and 16 in response to a predetermined value of motor armature current which is above the normal operating value but within the current range which flows when the motor falls out of synchronism. The relay 23, however, operates in response to a lower value of armature current than the overcurrent relay 10. As shown, the coil of the relay 23 is connected to the secondary winding of the current transformer 25, the primary winding of which is connected in series with one phase of the motor armature 2. The relay 23, however, may be connected directly in the motor armature circuit. Therefore, after the starting operation has been completed, the subsequent opening of the holding circuit of the closing coils 15 and 16 is effected by the relay 23 in case the motor falls out of synchronism. The circuit of the coils 15 and 16 is maintained, however, through the contacts 30 of relay 21 for a sufficient length of time after this holding circuit is closed to prevent these coils from being deenergized by the relay 23 due to any abnormally large current impulses being produced by the motor pulling into synchronism.

In order to prevent, for a predetermined time after the motor falls out of synchronism, the reconnection of the motor field winding 3 to the source of excitation 12, I provide in accordance with my invention a time relay 22 which is so connected that it prevents the circuit of the coils 15 and 16 from being completed for a predetermined time after it has been opened in response to the motor falling out of synchronism. As shown in the drawing, the relay 22 maintains the contacts 26 of the energizing circuit for the coil of relay 21 open for a predetermined time after the switch 14 is opened.

The operation of the arrangement shown in Fig. 1 is as follows: When it is desired to start the motor, the "start" switch 7 is closed so that an energizing circuit is completed for the closing coil 6 of switch 4 across one phase of the supply circuit 5. This energizing circuit also includes the normally closed contacts of the overcurrent relay 10 and the normally closed contacts of the "stop" switch 8. The energization of the closing coil 6 closes the switch 4 so that normal voltage is applied to the motor armature winding to start the motor from rest and accelerate it to synchronous speed. By closing its auxiliary contacts 28 the switch 4 completes for the closing coil 6 a locking circuit which is independent of the "start" switch 7 so that this switch may be opened without effecting the opening of the switch 4.

As soon as the motor armature winding 2 is energized, a voltage of slip frequency is induced in the motor field winding and this voltage causes a current of slip frequency to flow through the field winding 3 and the discharge resistor 11 and a pulsating current to flow through the rectifier 18 and the coil of relay 17. Until the motor reaches substantially synchronous speed, the magnitude and periodicity of this current through the coil of the relay 17 are such that the relay attracts its armature so as to maintain its contacts 20 open and its contacts 19 closed. The closing of the contacts 19, which occurs immediately after the switch 4 is closed, completes a circuit for the coil of the time relay 21. This circuit is from one side of a suitable source of control current through the auxiliary contacts 29 on the switch 4, contacts 26 of the relay 22, contacts 19 of the relay 17, coil of the relay 21 to the other side of the control circuit. The relay 21 is designed in any suitable manner so that, when energized, it immediately closes its contacts 30 but it does not open its contacts 30 until after the coil has been deenergized for a predetermined time. The closing of the contacts 30 at this time has no effect since the circuit through these contacts is open at the contacts 20 of the relay 17.

When the motor reaches substantially synchronous speed, the frequency of the induced current in the field winding 3 and resistor 11 becomes so low that the portion of each cycle during which no current flows through the coil of the relay 17 is sufficiently long to allow the relay to open its contacts 19 and close its contacts 20. The closing of the contacts 20 completes a circuit, through the contacts 30 of the relay 21 and the auxiliary contacts 29 on the switch 4, for the series connected closing coils 15 and 16 so that the switch 13 is opened to disconnect the discharge resistor 11 from the terminals of the field winding 3 and the switch 14 is closed to connect the field winding 3 across the source of excitation 12. The motor then pulls into synchronism and thereafter operates at synchronous speed unless the load causes it to be pulled out of synchronism.

As soon as the switches 13 and 14 have been operated a locking circuit is completed for the closing coils 15 and 16 through the contacts 24 of the pull out relay 23. In the particular arrangement shown in the drawing this circuit is completed by the auxiliary contacts 32 on the switch 14 but it is obvious these auxiliary contacts could be on the switch 13 as shown in Fig. 3.

The relay 17 by opening its contacts 19 when the motor reaches substantially synchronous speed opens the heretofore traced circuit for the coil of the relay 21 so that a predetermined time after the field winding 3 is excited with direct current, the relay 21 opens its contacts in the original energizing circuit of the coils 15 and 16. The circuit of the coil of relay 21 is also opened at the contacts 26 of the time relay 22 as soon as the switches 13 and 14 have been operated in response to the motor reaching approximately synchronous speed. In the arrangement shown in the drawing, this result is accomplished by providing the switch 14 with the auxiliary contacts 33 which complete, through the auxiliary contacts 29 on the switch 4, an energizing circuit for the coil of relay 22 when the switch 14 is closed. If desired, the auxiliary contacts 33 could be on the switch 13, as shown in Fig. 3, instead of the switch 14. The relay 22 is designed in any suitable manner so that it opens its contacts 26 as soon as its coil is energized but does not close these contacts until after its coil has been deenergized for a predetermined time.

In case the motor is pulled out of synchronism for any reason, the primary current of the motor increases to a value sufficiently high to cause the pull-out relay 23 to open its contacts 24 but not high enough to cause relay 10 to open its contacts. The opening of the contacts 24 interrupts the heretofore traced holding circuit of the coils 15 and 16 so that the switch 14 is opened to disconnect the field winding 3 from the source of excitation 12 and the switch 13 is closed to reconnect the discharge resistor 11 across the field winding 3 after relay 21 has opened its contacts 30 as above mentioned. The induced current in the field winding 3 then causes the relay 17 to open its contacts 20 and close its contacts 19, but the closing of the contacts 19 does not immediately complete the circuit of the coil of relay 21, because this circuit is still open at the contacts 26 of the relay 22. Although the circuit of the coil of the relay 22 is opened at the contacts 33 of the switch 14 when it opens, a predetermined time has to elapse before the contacts 26 can close. Therefore, when the motor falls out of synchronism, it is impossible to reestablish the running field connections of the motor for a predetermined time interval.

When a sufficient time has elapsed to allow the contacts 26 of relay 22 to close, the heretofore described circuit of the coil of the relay 21 is completed so that the relay contacts 30 in the energizing circuit of the closing coils 15 and 16 are closed. When the contacts 30 are closed and the motor is again running at substantially synchronous speed so that the relay contacts 19 are open as described above and the relay contacts 20 are closed, the switches 13 and 14 are again operated in the manner heretofore described to reconnect the field winding 3 across the source of excitation 12 to pull the motor into synchronism.

In the modification shown in Fig. 2, the time relays 21 and 22 are arranged so that the running field connections are established in case the motor accelerates to approximately synchronous speed before the time relay 22 closes its contacts 26 after the motor falls out of synchronism. It will be noted that in the arrangement shown in Fig. 1 the circuit of the relay 21 is not completed in case the motor reaches approximately synchronous speed before the relay 22 closes its contacts 26 because under such conditions the contacts 19 of relay 17 are opened at the time the contacts 26 of relay 22 are closed.

In the arrangement shown in Fig. 2 the motor is started and accelerated to approximately synchronous speed in the same manner as in Fig. 1. The closing of the auxiliary contacts 29 on the switch 4 in Fig. 2, however, first completes through the normally closed contacts 35 of the time relay 21 an energizing circuit for the coil of relay 22. The relay 22 immediately opens its contacts 26 and closes its contacts 37 which complete, through the auxiliary contacts 29 on the switch 4 and the auxiliary contacts 36 on the switch 14, an energizing circuit for the coil of relay 21. The relay 21 immediately completes, through its contacts 30, a locking circuit for itself which is independent of the contacts 37 of the relay 22. The relay 21 also opens its contacts 35 in the energizing circuit of the coil of relay 22. After a predetermined time the relay 22 opens its contacts 37 and closes its contacts 26 so that the contacts 29, 30 and 26 are connected in series with the contacts 20 of the relay 17 and the closing coils 15 and 16. Therefore, with the arrangement shown in Fig. 2, it will be seen that the relay 17 has sufficient time to operate and open its contacts 20 in response to the current induced in the motor field winding during the starting operation before the contacts 30 and 26 of relays 21 and 22 respectively are connected in series.

When the motor reaches approximately synchronous speed, the relay 17 operates in a manner described in connection with Fig. 1 to close its contacts 20 so that the closing coils 15 and 16 are energized to effect the opening of the switch 13 and the closing of the switch 14 which causes direct current to flow through the field winding 3 of the motor to pull it into synchronism. The closing of the auxiliary contacts 32 on the switch 14 completes a locking circuit for the coils 15 and 16 through the contacts 24 of the pull-out relay 23 in the same manner as in Fig. 1. In Fig. 2 the closing of the switch 14 also effects the deenergization of the coil of relay 21. The relay 21 after a time delay opens its contacts 30 in the original energizing circuit of the coils 15 and 16 which includes the contacts 24 of relay 23 and contacts 32 of switch 14 as mentioned above, and closes its contacts 35 so as to effect the energization of the coil of relay 22. The relay 22 then opens its contacts 26 in the original energizing circuit of the coils 15 and 16.

When the motor falls out of synchronism, the pull-out relay 23 opens its contacts 24 and interrupts the holding circuit of the closing coils 15 and 16 so that the switch 13 closes and the switch 14 opens. The closing of the auxiliary contacts 36 on the switch 14 completes the circuit of the coil of relay 21 which operates in the manner heretofore described to complete a locking circuit for its coil through its contacts 30 and to interrupt at its contacts 35 the energizing circuit for the coil of relay 22. After a predetermined time interval, the relay 22 closes its contacts 26 so that the contacts 29, 30 and 26 are again connected in series. Therefore, when the relay 17 again closes its contacts 20 in response to the motor reaching substantially synchronous speed, the coils 15 and 16 are again energized to reestablish the running field connections of the motor.

In the modification shown in Fig. 2, it will be seen that if the motor should reach synchronous speed before the relay 22 has had time to close its contacts 26, the running field connections nevertheless will be established as soon as the desired time interval, which is determined by the time of operation of relay 22, has elapsed.

The single field switch 13 shown in Fig. 3 may also be used for the two field switches 13 and 14 of Fig. 2 except that it would be provided with a contact 36 in place of contact 33.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, a synchronous motor having a field winding, switching means including electroresponsive means for controlling the connections of said field winding, means controlled by the speed of said motor for completing for a predetermined time an energizing circuit for said electroresponsive means when said motor operates at substantially synchronous speed, a contact controlling device responsive to a condition indicative of the motor falling out of synchronism, and means controlled by the operation of said switching means for completing a locking circuit for said electroresponsive means through the contacts of said device before said energizing circuit is opened.

2. In combination, a synchronous motor having a field winding, switching means including electroresponsive means for controlling the connections of said field winding, means controlled by the speed of said motor for completing an energizing circuit for said electroresponsive means when said motor operates at substantially synchronous speed, a contact controlling device responsive to a condition indicative of the motor falling out of synchronism, and means controlled by the operation of said switching means for completing a locking circuit for said electroresponsive means through the contacts of said device and for interrupting the original energizing circuit of said electroresponsive means after said switching means has been operated for a predetermined time.

3. In combination, a synchronous motor having a field winding, switching means including electroresponsive means for controlling the connections of said field winding, means controlled by the speed of said motor for completing an energizing circuit for said electroresponsive means when said motor operates at substantially synchronous speed, a contact controlling device responsive to a condition indicative of the motor falling out of synchronism, means controlled by the operation of said switching means for completing a locking circuit for said electroresponsive means through the contacts of said device, and timing means controlled by the operation of said switching means for interrupting the original energizing circuit of said electroresponsive means after it has been energized a predetermined time.

4. In combination, a synchronous motor having a field winding, switching means including electroresponsive means for controlling the connections of said field winding, means controlled by the speed of said motor for completing an energizing circuit for said electroresponsive means when said motor operates at substantially synchronous speed, a contact controlling device responsive to a condition indicative of the motor falling out of synchronism, means controlled by the operation of said switching means for completing a locking circuit for said electroresponsive means through the contacts of said device, and timing means controlled by the operation of said switching means for interrupting the original energizing circuit of said electroresponsive means after it has been energized a predetermined time and for preventing the completion of said original energizing circuit for a predetermined time after said contact controlling device effects the opening of its contacts in said holding circuit.

5. In combination, a synchronous motor having a field winding, switching means including electroresponsive means for controlling the connections of said field winding, means controlled by the speed of said motor for completing an energizing circuit for said electroresponsive means when said motor operates at substantially synchronous speed a contact controlling device responsive to a condition indicative of the motor falling out of synchronism, means controlled by the operation of said switching means for completing a locking circuit for said electroresponsive means through the contacts of said device and for interrupting the original energizing circuit of said electroresponsive means, and timing means controlled by the operation of said switching means when said motor falls out of synchronism for preventing for a predetermined time the completion of said original energizing circuit of said electroresponsive device by said speed controlled means.

6. In combination, a synchronous motor having a field winding, a source of excitation, switching means for controlling the connections of said field winding to said source, means responsive to the speed of said motor for effecting the operation of said switching means to connect said field winding to said source, means responsive to a condition of said motor indicative of the falling out of synchronism of said motor for effecting the operation of said switching means to disconnect said field winding from said source, and timing means operative in response to the motor falling out of synchronism for preventing said speed responsive means from effecting for a predetermined time the operation of said switching means to reconnect said field winding to said source.

7. In combination, a synchronous motor having a field winding, a source of excitation, electromagnetic switching means for controlling the connections of said field winding including a control circuit which, when energized, effects the operation of said switching means to connect the field winding to said source, a relay having in said circuit normally open contacts which are closed when said relay is energized and which are opened after a time delay when said relay is deenergized, means for energizing said relay in accordance with a predetermined operating condition of said motor, and means responsive to a predetermined speed condition of said motor for effecting the deenergization of said relay and the energization of said control circuit and the completion of a shunt circuit around the contacts of said relay.

8. In combination, a synchronous motor having a field winding, a source of excitation, electromagnetic switching means for controlling the connections of said field winding including a control circuit which, when energized, effects the operation of said switching means to connect the field winding to said source, a relay having in said circuit normally open contacts which are closed when said relay is energized and which are opened after a time delay when said relay is deenergized, an alternating current supply circuit, means for controlling the connection of said supply circuit to the armature winding of said motor, means controlled in accordance with a predetermined connection of said supply circuit and armature winding for effecting the energization of said relay, means responsive to the speed of said motor for effecting the energization of said control circuit when said motor is operating at substantially synchronous speed, and means controlled by the operation of said switching means in response to the energization of said control circuit for effecting an interruption in the circuit of said relay and the completion of a shunt circuit around said contacts of said relay.

9. In combination, a synchronous motor having a field winding, a source of excitation, electromagnetic switching means for controlling the connections of said field winding including a control circuit which when energized effects the operation of said switching means to connect the field winding to said source, means responsive to the speed of said motor for effecting the energization of said control circuit when said motor operates at substantially synchronous speed, means responsive to a condition of said motor indicative of the falling out of synchronism thereof for effecting the operation of said switching means to disconnect said field winding from said source, and means for preventing the reenergization of said control circuit by said speed responsive means for a predetermined time after said field winding is disconnected from said source including a relay having in said control circuit contacts which are open when said relay is energized and which are closed with a time delay when said relay is deenergized and means for effecting the energization of said relay while said field winding is connected to said source and the deenergization of said relay when said field winding is disconnected from said source.

10. In combination, a synchronous motor having a field winding, a source of excitation, switching means for controlling the connections of said field winding, a control circuit for said switching means, means controlled by the speed of said motor for controlling said control circuit so as to effect the operation of said switching means to connect said field winding to said source of excitation when the motor is operating at substantially synchronous speed, means for effecting the operation of said switching means to disconnect said field winding from said source when said motor falls out of synchronism, contacts in said control circuit, and means for controlling said contacts when said motor falls out of synchronism so that for a predetermined time after said motor falls out of synchronism said switching means cannot be operated to reconnect said field winding to said source.

11. In combination, a synchronous motor having a field winding, a source of excitation, switching means for controlling the connections of said field winding, a control circuit for said switching means, a relay having contacts in said control circuit which are closed when said relay is energized and which are opened after a predetermined time interval when said relay is deenergized, means controlled by a predetermined operative condition of said motor for effecting the energization of said relay, means controlled by the speed of said motor for effecting the deenergization of said relay and the operation of said switching means to connect said field winding to said source when said motor is operating at substantially synchronous speed, and means controlled by said switching means for completing a shunt circuit around said relay contacts when said field winding is connected to said source of excitation.

12. In combination, a synchronous motor having a field winding, a source of excitation, switching means for controlling the connections of said field winding, a control circuit for said switching means, a relay having contacts in said control circuit which are closed when said relay is energized and which are opened after a predetermined time interval when said relay is deenergized, an alternating current supply circuit, a switch for connecting said motor to said supply circuit, means controlled by said switch and switching means for completing an energizing circuit for said relay only when said motor is connected to said supply circuit and said field winding is disconnected from said source of excitation, means responsive to the speed of said motor for completing said control circuit to effect the operation of said switching means to connect the field winding to said source of excitation, and means controlled by said switching means for completing a shunt circuit around said relay contacts when said field winding is connected to said source of excitation.

13. In combination, a synchronous motor having a field winding, a source of excitation, switching means for controlling the connections of said field winding, a control circuit for said switching means, a relay having contacts in said control circuit which are open when said relay is energized and which are closed after a predetermined time interval when said relay is denergized, means responsive to the speed of said motor for effecting the operation of said switching means to connect said field winding to said source, means for effecting the operation of said switching means to disconnect said field winding from said source, and means controlled by said switching means for effecting the energization of said relay when said field winding is connected to said source by said switching means and for effecting the deenergization of said relay when said field winding is disconnected from said source by said switching means.

14. In combination, a synchronous motor having a field winding, a source of excitation, switching means for controlling the connections of said field winding, a control circuit for said switching means, a relay having contacts in said control circuit which are open when said relay is energized and which are closed after a predetermined time interval when said relay is deenergized, means responsive to the speed of said motor for effecting the operation of said switching means to connect said field winding to said source, means for effecting the operation of said switching means to disconnect said field winding from said source, an alternating current supply circuit, a switch for connecting said motor to said supply circuit, means controlled by said switch for effecting the energization and the immediate deenergization of said relay when said switch is closed, and means controlled by said switching means for effecting the energization of said relay when said field winding is connected to said source by said switching means and for effecting the deenergization of said relay when said field winding is disconnected from said source by said switching means.

In witness whereof, I have hereunto set my hand.

SAMUEL C. EWING.